US011773225B2

(12) United States Patent
Fukushima et al.

(10) Patent No.: US 11,773,225 B2
(45) Date of Patent: Oct. 3, 2023

(54) MOLDED ARTICLE

(71) Applicant: DAIKIN INDUSTRIES, LTD., Osaka (JP)

(72) Inventors: Toshiyuki Fukushima, Osaka (JP); Kyouhei Sawaki, Osaka (JP); Ken Okanishi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 350 days.

(21) Appl. No.: 17/043,582

(22) PCT Filed: Mar. 27, 2019

(86) PCT No.: PCT/JP2019/013103
§ 371 (c)(1),
(2) Date: Sep. 29, 2020

(87) PCT Pub. No.: WO2019/189316
PCT Pub. Date: Oct. 3, 2019

(65) Prior Publication Data
US 2021/0024709 A1 Jan. 28, 2021

(30) Foreign Application Priority Data
Mar. 30, 2018 (JP) .................. 2018-069585

(51) Int. Cl.
| C08J 5/18 | (2006.01) |
| C08F 114/24 | (2006.01) |
| C08F 214/26 | (2006.01) |
| B29C 43/00 | (2006.01) |
| B29C 43/52 | (2006.01) |
| C08F 214/22 | (2006.01) |
| B29K 27/18 | (2006.01) |

(52) U.S. Cl.
CPC .............. *C08J 5/18* (2013.01); *B29C 43/003* (2013.01); *B29C 43/52* (2013.01); *C08F 114/24* (2013.01); *C08F 214/22* (2013.01); *C08F 214/26* (2013.01); *C08F 214/262* (2013.01); *C08F 214/265* (2013.01); *B29K 2027/18* (2013.01); *C08J 2323/08* (2013.01); *C08J 2327/04* (2013.01); *C08J 2327/16* (2013.01); *C08J 2327/18* (2013.01); *C08J 2327/20* (2013.01)

(58) Field of Classification Search
CPC combination set(s) only.
See application file for complete search history.

(56) References Cited

U.S. PATENT DOCUMENTS

| 6,146,923 A * | 11/2000 | Ohmi ................... B29C 59/022 |
| | | 427/302 |
| 7,452,602 B2 * | 11/2008 | Wada ..................... B32B 27/30 |
| | | 525/70 |
| 2001/0027240 A1 * | 10/2001 | Okanishi ................ C08L 27/18 |
| | | 526/255 |
| 2002/0086963 A1 | 7/2002 | Higuchi et al. |
| 2009/0249883 A1 | 10/2009 | Hikosaka et al. |
| 2010/0063235 A1 | 3/2010 | Hikosaka et al. |
| 2010/0110609 A1 | 5/2010 | Koh et al. |
| 2011/0300364 A1 | 12/2011 | Hikosaka et al. |
| 2012/0018917 A1 | 1/2012 | Washiyama et al. |
| 2014/0016176 A1 | 1/2014 | Kodani et al. |
| 2015/0368413 A1 | 12/2015 | Tatemichi et al. |
| 2016/0130388 A1 | 5/2016 | Nishikawa et al. |
| 2017/0295645 A1 | 10/2017 | Hikosaka et al. |

FOREIGN PATENT DOCUMENTS

| EP | 3 778 724 A1 | 2/2021 |
| JP | 2002-219750 A | 8/2002 |
| JP | 2008-248039 A | 10/2008 |
| JP | 2010-168485 A | 8/2010 |
| JP | 2012-149152 A | 8/2012 |
| JP | 2013-237730 A | 11/2013 |
| JP | 2014-156581 A | 8/2014 |
| JP | 2016-65217 A | 4/2016 |
| JP | 2016-125029 A | 7/2016 |
| JP | 2017-043829 A | 3/2017 |
| JP | 2017-155087 A | 9/2017 |
| KR | 10-2009-0030825 A | 3/2009 |
| KR | 10-2016-0007623 A | 1/2016 |
| WO | 2007/026832 A1 | 3/2007 |
| WO | 2008/090947 A1 | 7/2008 |
| WO | 2008/108251 A1 | 9/2008 |
| WO | 2010/084750 A1 | 7/2010 |

(Continued)

OTHER PUBLICATIONS

Hikosaka et al., "Thermal resistance and mechanical strength of nano oriented crystals (NOCs) of polymers", Polymer Preprints, Japan, vol. 64. No. 2, Aug. 25, 2015 (9 pages total).

Okada et al., "Nucleation mechanism and universality of nano-oriented crystals in elongational crystallization", Polymer Preprints, Japan, vol. 63, No. 1, 2014 (6 pages total).

Fukushima et al., "Supercooling Dependence of Nucleation Rate of Poly(vinylidene fluoride/tetrafluoroethylene)", Polymer Preprints, Japan, vol. 66, No. 1, May 15, 2017 (9 pages total).

Okada et al., "Elongational crystallization of isotactic polypropylene forms nano-oriented crystals with ultra-high performance", Polymer Journal (2010) vol. 42, pp. 464-473 (10 pages total).

(Continued)

*Primary Examiner* — Nicole M. Buie-Hatcher
(74) *Attorney, Agent, or Firm* — Sughrue Mion, PLLC

(57) ABSTRACT

A molded article containing a crystal of a fluoropolymer. The fluoropolymer contains at least one selected from vinylidene fluoride/tetrafluoroethylene copolymer, polychlorotrifluoroethylene, an ethylene/tetrafluoroethylene copolymer, a tetrafluoroethylene/perfluoro(alkyl vinyl ether) copolymer and a tetrafluoroethylene/hexafluoropropylene copolymer. Further, the crystal is a nano-oriented crystal having a size of 300 nm or smaller.

2 Claims, 9 Drawing Sheets

(56) References Cited

FOREIGN PATENT DOCUMENTS

| WO | 2012/108463 A1 | 8/2012 |
| WO | 2016/035598 A1 | 3/2016 |

OTHER PUBLICATIONS

Hikosaka et al., "Melt elongational crystallization and nano-oriented crystals (NOCs) of polymers", Polymer Preprints, Japan, vol. 60, No. 2, pp. 2185-2187, 2011 (11 pages total).

Okada et al., "Study of formation of nano-oriented crystals crystallized at super critical elongational field", Polymer Preprints, Japan, vol. 60, No. 2, pp. 3014-3015, 2011 (7 pages total).

International Search Report dated Jul. 2, 2019 for PCT Application No. PCT/JP2019/013103.

Extended European Search Report for counterpart EP Application No. 19777426.8 dated Oct. 27, 2021.

"Database WPI"; Week 201650; Jul. 11, 2016 (Jul. 11, 2016); Thomson Scientific, London, GB; AN 2016-41713N; XP002804455 (2 pages total).

"Database WPI"; Week 201379; Nov. 28, 2013 (Nov. 28, 2013); Thomson Scientific, London, GB; AN 2013-V69562; XP002804456 (2 pages total).

International Preliminary Report on Patentability dated Oct. 6, 2020 from the International Bureau in International Application No. PCT/JP2019/013103.

\* cited by examiner

MOLDED ARTICLE

CROSS REFERENCE TO RELATED APPLICATIONS

This application is a National Stage of International Application No. PCT/JP2019/013103, filed on Mar. 27, 2019, which claims priority from Japanese Patent Application No. 2018-069585, filed on Mar. 30, 2018.

TECHNICAL FIELD

The disclosure relates to molded articles.

BACKGROUND ART

Fluoropolymers of crystallizable polymers such as vinylidene fluoride/tetrafluoroethylene copolymers and polychlorotrifluoroethylene have excellent properties such as non-stickiness, heat resistance, low friction, and electric properties and can therefore be used for a variety of applications.

The characteristics of molded products from such crystallizable polymers are known to depend on the crystallinity and crystal structure of the polymers, and molding techniques therefor are studied.

For example, Patent Literature documents 1 to 6 and Non-Patent Literature documents 1 to 4 disclose molding techniques for isotactic polypropylene (i-PP), polyester, polyvinylidene fluoride, and vinylidene fluoride/trifluoroethylene copolymers.

CITATION LIST

Patent Literature

Patent Literature 1: WO 2007/026832
Patent Literature 2: JP 2008-248039 A
Patent Literature 3: WO 2008/108251
Patent Literature 4: JP 2010-168485 A
Patent Literature 5: WO 2016/035598
Patent Literature 6: JP 2002-219750 A

Non-Patent Literature

Non-Patent Literature 1: K. Okada, J. Washiyama, K. Watanabe, S. Sasaki, H. Masunaga, M. Hikosaka, Polymer J., 2010, 42, 464-473
Non-Patent Literature 2: M. Hikosaka, K. Okada, Polym. Prepr., Jpn. 2011, 60(2), 2185-2187
Non-Patent Literature 3: M. Hikosaka, K. Okada, Polym. Prepr., Jpn. 2011, 60(2), 3014-3015
Non-Patent Literature 4: Hikosaka, M. et al., Polymer Preprints, Japan 64(2), 1G11 (2015)

SUMMARY OF INVENTION

Technical Problem

The disclosure aims to provide a molded article having excellent mechanical strength and heat resistance.

Solution to Problem

The disclosure relates to a molded article containing a crystal of a fluoropolymer, the fluoropolymer containing at least one selected from the group consisting of a vinylidene fluoride/tetrafluoroethylene copolymer, polychlorotrifluoroethylene, an ethylene/tetrafluoroethylene copolymer, a tetrafluoroethylene/perfluoro(alkyl vinyl ether) copolymer, and a tetrafluoroethylene/hexafluoropropylene copolymer, the crystal being a nano-oriented crystal having a size of 300 nm or smaller.

The fluoropolymer preferably has high crystallinity.

Advantageous Effects of Invention

The molded article of the disclosure having the above structure can have excellent mechanical strength and heat resistance.

DESCRIPTION OF EMBODIMENTS

Figure 1:
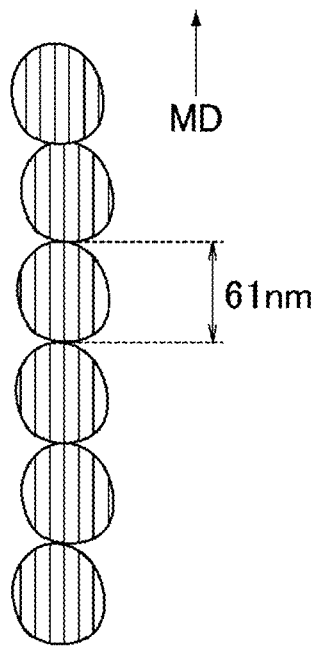
FIG. 1 is a schematic view of a structure of nano-oriented crystals (NOCs).

The following description will discuss details of the molded article of the disclosure. The molded article of the disclosure is not limited to the following description. Besides the examples below, the molded article of the disclosure may be modified and put into practice as appropriate within the spirit of the molded article of the disclosure. All literature documents described in the description are hereby incorporated by reference.

A fluoropolymer containing a polymerized unit based on vinylidene fluoride, tetrafluoroethylene, or chlorotrifluoroethylene exhibits excellent characteristics such as heat resistance, incombustibility, chemical resistance, and weather resistance as a result of containing vinylidene fluoride, tetrafluoroethylene, or chlorotrifluoroethylene in the main chain. In contrast, a molded product thereof has a mechanical strength that remains one order of magnitude smaller than that of other engineering plastics, such as polyether ether ketone (PEEK). A fluoropolymer containing a polymerized unit based on vinylidene fluoride, tetrafluoroethylene, or chlorotrifluoroethylene with improved mechanical strength enables thinning of a film and the resulting weight reduction.

Films of any single fluororesin other than PVdF are likely to have pores or slits formed in a common stretching technique and are difficult to have a uniform thickness by stretching. As a result, these fluoropolymers have a small effect of improving the physical properties.

The inventors succeeded in obtaining a molded article containing very small nano-oriented crystals of a fluoropolymer by elongational crystallization of a melt of the fluoropolymer at a rate not lower than the critical elongational strain rate. The inventors then found that the resulting molded article has excellent mechanical strength and heat resistance, reaching development of the molded article of the disclosure.

The molded article of the disclosure contains a nano-oriented crystal of a fluoropolymer, the crystal having a size of 300 nm or smaller.

The crystal size of the fluoropolymer contained in the molded article of the disclosure is 300 nm or smaller. In order to provide a molded article having better mechanical strength and heat resistance, the crystal size is preferably 200 nm or smaller, more preferably 150 nm or smaller, still more preferably 100 nm or smaller, particularly preferably 70 nm or smaller.

The lower limit of the crystal size may be, but is not limited to, 3 nm. In order to achieve more improved heat resistance, the crystal size is preferably 5 nm or greater, more preferably 8 nm or greater, still more preferably 10 nm or greater.

The crystal size can be determined by a known small-angle X-ray scattering technique (hereinafter, referred to as "SAXS").

The primary peak of a scattering vector (q)-small-angle X-ray scattering intensity (Ix) curve in SAXS corresponds to the shortest distance between microcrystals (=crystal size d) in cases where microcrystals having an average size d are randomly packed (reference: A. Guinier, "Ekkusu-sen Kes-sho-gaku no Riron to Jissai (Theory and Practice of X-ray crystallography)", Rigaku Corp., p 513, 1967). Thus, the crystal size d is calculated by the following Bragg equation.

$$d = 2\pi \div q \quad \text{Bragg equation:}$$

In order to achieve better mechanical strength and heat resistance, the molded article of the invention is preferably a fluoropolymer having high crystallinity.

The crystals of the fluoropolymer constitute nano-oriented crystals (NOCs). NOCs each have a crystal size of 300 nm or smaller and include crystals (also referred to as nano crystals, NCs) of the fluoropolymer in which the polymer chain is oriented in the elongational direction (machine direction, MD).

The results of X-ray diffraction demonstrate that the NOCs have a structure in which spherical nano crystals (NCs) are linked in the form of a rosary along the elongational direction (MD) as illustrated in FIG. 1.

In order to achieve better mechanical strength, heat resistance, and transparency, the molded article of the disclosure preferably contains NOCs of a fluoropolymer as a main component.

Whether the polymer chain of NCs included in the NOCs constituting the molded article or the NCs themselves constituting the NOCs is/are oriented can be observed using a polarization microscope or by a known X-ray diffraction technique (small-angle X-ray scattering, wide-angle X-ray scattering). The examples to be described later can be referred to as appropriate for specific methods of the observation using a polarization microscope and the X-ray diffraction techniques (small-angle X-ray scattering, wide-angle X-ray scattering).

The NCs included in the NOCs and the polymer chains included in the NCs are oriented substantially in MD of the molded article (e.g., sheet).

The crystal size of each NC constituting the NOCs can be determined by measuring the size in MD. For example, the crystal size of a NOC illustrated in FIG. 1 can be determined as about 61 nm.

Whether the polymer chain of NCs included in the NOCs constituting the molded article or the NCs themselves constituting the NOCs is/are oriented can be observed using a polarization microscope or by a known X-ray diffraction technique (small-angle X-ray scattering (SAXS), wide-angle X-ray scattering (WAXS)). High crystallinity of the molded article can be concluded by the fact that amorphous halo is hardly observed by WAXS. The examples to be described later can be referred to as appropriate for specific methods of the observation using a polarization microscope and the X-ray diffraction techniques (small-angle X-ray scattering, wide-angle X-ray scattering).

The molded article of the disclosure has a melting point that is preferably higher than the temperature that is 150° lower than the equilibrium melting point of the fluoropolymer at rest. The melting point of the molded article is more preferably higher than the temperature that is 10° C. lower than the equilibrium melting point at rest, still more preferably higher than the temperature that is 5° C. lower than the equilibrium melting point at rest. The melting point of the molded article of the invention is also preferably higher than the equilibrium melting point of the fluoropolymer at rest. The molded article of the disclosure having the above structure can have a melting point higher than the equilibrium melting point of the fluoropolymer at rest.

The equilibrium melting point ($T_m^0$) at rest means the melting point of a macroscopic perfect crystal that is formed with the molecule chain of a polymer (hereinafter, also referred to as "polymer chain" as appropriate) being fully stretched, and is calculated by the following formula:

$$T_m^0 = \Delta H_u \div \Delta S_u$$

wherein $\Delta H_u$ is the enthalpy of fusion and $\Delta S_u$ is the entropy of fusion.

Specifically, the equilibrium melting point at rest is determined by the method of Hikosaka et al. using a polarization microscope.

The melting point is contrasted to the equilibrium melting point of a fluoropolymer having the same monomer compositional ratio.

The fluoropolymer is usually melt-fabricable. The term "melt-fabricable" herein means that a polymer can be melted and processed using a conventional processing device such as an extruder or an injection molding machine. This term also means that a polymer can be heated and melted at a temperature not lower than the melting point and processed using a device such as a compression molding machine.

The fluoropolymer contains at least one selected from the group consisting of a vinylidene fluoride (VdF)/tetrafluoroethylene (TFE) copolymer, polychlorotrifluoroethylene (PCTFE), an ethylene/TE copolymer (ETFE), a TFE/perfluoro(alkyl vinyl ether) (PAVE) copolymer (PFA), and a TFE/hexafluoropropylene (HFP) copolymer (FEP).

In order to achieve significantly improved mechanical strength and heat resistance, the fluoropolymer preferably contains at least one selected from the group consisting of PCTFE, a VdF/TFE copolymer, and ETFE, more preferably PCTFE.

The respective fluoropolymers are described hereinbelow.
(VdF/TFE Copolymer)

The VdF/TFE copolymer is a copolymer containing a polymerized unit based on VdF (hereinafter, also referred to as a "VdF unit") and a polymerized unit based on TFE (hereinafter, also referred to as a "TFE unit").

In order to provide a molded article having better mechanical strength, heat resistance, and transparency, the VdF/TFE copolymer preferably contains 50 to 95 mol % of a VdF unit and 5 to 50 mol % of a TFE unit relative to 100 mol % in total of the VdF unit and the TFE unit. In the VdF/TFE copolymer, more preferably, the VdF unit represents 60 to 95 mol % and the TFE unit represents 5 to 40 mol %, particularly preferably, the VdF unit represents 70 to 90 mol % and the TFE unit represents 10 to 30 mol %.

The VdF/TFE copolymer may consist only of a VdF unit and a TFE unit, or may contain a polymerized unit based on a monomer copolymerizable with VdF and TFE and other than VdF and TFE. The VdF/TFE copolymer preferably contains the VdF unit and the TFE unit in a total amount of 90 mol % or more, more preferably 95 mol % or more, still more preferably 98 mol %, of all polymerized units.

Examples of the monomer copolymerizable with VdF and TFE include hexafluoropropylene (HFP), ethylene, propylene, alkyl vinyl ether, vinyl acetate, vinyl chloride, vinylidene chloride, $CH_2=CHCF_3$, $CH_2=CFCF_3$, $CH_2=CF(CF_2)_nH$ (n=3 to 7), and $CH_2=CH(CF_2)_nF$ (n=1 to 8).

Preferred among these is at least one selected from the group consisting of HFP and $CH_2=CFCF_3$, more preferred is HFP.

In order to provide a molded article having better mechanical strength, heat resistance, and transparency, the polymerized unit based on a monomer copolymerizable with VdF and TFE is preferably in an amount of 0 to 10 mol %, more preferably 0.01 to 5 mol %, still more preferably 0.1 to 2 mol %.

The VdF/TFE copolymer used in the disclosure preferably has a weight average molecular weight of 10000 or higher, more preferably 50000 or higher, while preferably 800000 or lower, more preferably 600000 or lower, still more preferably 400000 or lower. The weight average molecular weight is a value determined by gel permeation chromatography (GPC).

In the case where the fluoropolymer is a VdF/TFE copolymer, the molded article of the invention preferably has a tensile strength at break of 100 MPa or higher. The tensile strength at break is more preferably 150 MPa or higher, still more preferably 190 MPa or higher.

In the case where the fluoropolymer is a VdF/TFE copolymer, the molded article of the disclosure preferably has an elastic modulus of 1.0 GPa or higher. The elastic modulus is more preferably 1.2 GPa or higher, still more preferably 1.5 GPa or higher, particularly preferably 2.0 GPa or higher.

The tensile strength at break and the elastic modulus herein are values determined using a heat stretching stage for microscopy (Linkam Tensile Testing System TST350, System Controllers T95-PE), software (Linksys 32 System Control and Image Capture Software), and a test piece having a width of 2 mm and a thickness of 0.01 to 0.3 mm at a chuck-to-chuck distance of 2 mm. The tensile rate is 0.1 mm/s.

In the case where the fluoropolymer is a VdF/TFE copolymer, the molded article of the disclosure preferably has a heatproof temperature of 90° C. or higher. The heatproof temperature is more preferably 110° C. or higher, still more preferably 130° C. or higher.

The "heatproof temperature" herein means the heatproof temperature measured by test-piece size direct reading using an optical microscope. The "test-piece size direct reading" is performed using an optical microscope (BX51, available from Olympus Corp.), a heat stretching stage for microscopy (Linkam Tensile Testing System TST350, System Controllers T95-PE, Linksys 32 System Control and Image Capture Software), and image analysis software (Linksys 32 System Control and Image Capture Software) that can quantify the size on a display. The test piece used has a size of 0.6 mm in length and 0.4 to 0.7 mm in width. The test piece is heated up to 150° C. at a temperature-increasing rate of 10 K/min, maintained at 150° C. for 30 minutes, and then heated at 10 K/min. The temperature at which the test piece started to deform (shrink or expand) by 3% or more in the longitudinal direction (MD) or the transverse direction (TD) is defined as the heatproof temperature.

In the case where the fluoropolymer is a VdF/TFE copolymer, the molded article of the disclosure preferably has a melting point of 130° C. or higher, more preferably 135° C. or higher, still more preferably 140° C. or higher.

The melting point of the molded article herein is the temperature corresponding to the maximum value on a heat-of-fusion curve drawn by increasing the temperature at a rate of 10 K/min using a differential scanning calorimeter (DSC).
(PCTFE)

Examples of the PCTFE include chlorotrifluoroethylene (CTFE) homopolymers and copolymers of a polymerized unit based on CTFE ("CTFE unit") and a polymerized unit based on a monomer (a) polymerizable with CTFE ("monomer (a) unit").

PCTFE preferably contains a CTFE unit in an amount of 90 to 100 mol %. In order to achieve better moisture-proof properties, the amount of the CTFE unit is more preferably 98 to 100 mol %, still more preferably 99 to 100 mol %.

In the case where PCTFE is a copolymer of a CTFE unit and a monomer (a) unit, the monomer (a) may be any monomer copolymerizable with CTFE and examples thereof include tetrafluoroethylene (TFE), ethylene (Et), vinylidene fluoride (VdF), perfluoro(alkyl vinyl)ether (PAVE), a vinyl monomer represented by the following formula (I):

$$CX^3X^4=CX^1(CF_2)_nX^2 \quad (I)$$

(wherein $X^1$, $X^3$, and $X^4$ are the same as or different from each other and are each a hydrogen atom or a fluorine atom; $X^2$ is a hydrogen atom, a fluorine atom, or a chlorine atom; and n is an integer of 1 to 10), and an alkyl perfluorovinyl ether derivative represented by the following formula (II):

$$CF_2=CF-OCH_2-Rf \quad (II)$$

(wherein Rf is a C1-C5 perfluoroalkyl group).

Examples of the PAVE include perfluoro(methyl vinyl ether) (PMVE), perfluoro(ethyl vinyl ether) (PEVE), perfluoro(propyl vinyl ether) (PPVE), and perfluoro(butyl vinyl ether).

Examples of the vinyl monomer represented by the formula (I) include, but are not limited to, hexafluoropropylene (HFP), perfluoro(1,1,2-trihydro-1-hexene), perfluoro(1,1,5-trihydro-1-pentene), and perfluoro(alkyl)ethylene represented by the following formula (III):

$$H_2C=CX^5Rf^5 \quad (III)$$

wherein $X_5$ is H, F, or $CF_3$; and $Rf^5$ is a C1-C10 perfluoroalkyl group. The perfluoro(alkyl)ethylene is preferably perfluoro(butyl)ethylene.

The alkyl perfluorovinyl ether derivative represented by the formula (II) is preferably one in which Rf is a C1-C3 perfluoroalkyl group, more preferably $CF_2=CF-OCH_2-CF_2CF_3$.

The monomer (a) polymerizable with CTFE preferably contains at least one selected from the group consisting of TFE, Et, VdF, PAVE, and a vinyl monomer represented by the formula (I). One or two or more of the above monomer (a) may be used.

The monomer (a) used may also be an unsaturated carboxylic acid copolymerizable with CTFE. Examples of the unsaturated carboxylic acid include, but are not limited to, C3-C6 unsaturated aliphatic carboxylic acids such as (meth) acrylic acid, crotonic acid, maleic acid, fumaric acid, itaconic acid, citraconic acid, mesaconic acid, and aconitic acid, and may also include C3-C6 unsaturated aliphatic polycarboxylic acids.

Examples of the unsaturated aliphatic polycarboxylic acids include, but are not limited to, maleic acid, fumaric acid, itaconic acid, citraconic acid, mesaconic acid, and aconitic acid. Those capable of being in the form of an acid anhydride, such as maleic acid, itaconic acid, and citraconic acid, may optionally be in the form of an acid anhydride.

Two or more monomers (a) may be used. If one of them is VdF, PAVE, or HFP, the monomers may not be used in combination with itaconic acid, citraconic acid, and acid anhydrides thereof.

PCTFE used in the disclosure preferably has a flow value of $1 \times 10^{-5}$ (cc/s) or higher, more preferably $1 \times 10^{-4}$ (cc/s) or higher, still more preferably $5 \times 10^{-4}$ (cc/s) or higher, while preferably 1 (cc/s) or lower, more preferably $1 \times 10^{-2}$ (cc/s) or lower, still more preferably $5 \times 10^{-3}$ (cc/s) or lower.

The flow value is a value measured using a Koka flowtester at a measurement temperature of 230° C., a load of 980 N, and a nozzle diameter of 1 mmφ.

In the case where the fluoropolymer is PCTFE, the molded article of the invention preferably has a tensile strength at break of 120 MPa or higher, more preferably 130 MPa or higher, still more preferably 150 MPa or higher.

In the case where the fluoropolymer is PCTFE, the molded article of the invention preferably has an elastic modulus of 1.0 GPa or higher. The elastic modulus is more preferably 1.2 GPa or higher, still more preferably 1.5 GPa or higher, particularly preferably 2.0 GPa or higher.

In the case where the fluoropolymer is PCTFE, the molded article of the invention preferably has a heatproof temperature of 120° C. or higher. The heatproof temperature is more preferably 150° C. or higher, still more preferably 170° C. or higher.

In the case where the fluoropolymer is PCTFE, the molded article of the disclosure preferably has a melting point of 220° C. or higher, more preferably 225° C. or higher, still more preferably 230° C. or higher.

Elongational crystallization by the production method to be described later can make the melting point of the molded article higher than the equilibrium melting point of PCTFE at rest. In the case of a CTFE homopolymer, the equilibrium melting point of PCTFE at rest measured by the aforementioned method is 228° C. (M. Hikosaka et al., Polymer Preprints, Japan 1989, 38(10), 3308-3310).

(ETFE)

ETFE is preferably a copolymer having a ratio by mole of a TFE unit and an ethylene unit (TFE unit/ethylene unit) of 20/80 or higher and 90/10 or lower. The ratio by mole is more preferably 37/63 or higher and 85/15 or lower, still more preferably 38/62 or higher and 80/20 or lower. ETFE may be a copolymer of TFE, ethylene, and a monomer copolymeriable with TFE and ethylene. Examples of the copolymerizable monomer include monomers represented by the following formulas:

$$CH_2=CX^5Rf^3, CF_2=CFRf^3, CF_2=CFORf^3, \text{ and}$$
$$CH_2=C(Rf^3)_2$$

(wherein $X^5$ is a hydrogen atom or a fluorine atom; and $Rf^3$ is a fluoroalkyl group optionally containing an ether bond). Preferred among these are fluorine-containing vinyl monomers represented by $CF_2=CFRf^3$, $CF_2=CFORf^3$, and $CH_2=CX^5Rf^3$, and more preferred are HFP, perfluoro(alkyl vinyl ether) represented by $CF_2=CF-Rf^4$ (wherein $Rf^4$ is a C1-C5 perfluoroalkyl group), and a fluorine-containing vinyl monomer represented by $CH_2=CX^5Rf^3$ (wherein $Rf^3$ is a C1-C8 fluoroalkyl group). The monomer copolymerizable with TFE and ethylene may be an aliphatic unsaturated carboxylic acid such as itaconic acid or an itaconic anhydride. The monomer copolymerizable with TFE and ethylene is preferably in an amount of 0.1 to 10 mol %, more preferably 0.1 to 5 mol %, particularly preferably 0.2 to 4 mol %, relative to the fluorine-containing polymer.

ETFE used in the disclosure preferably has a MER of 0.1 g/10 min or more, more preferably 0.5 g/10 min or more, still more preferably 1 g/10 min or more, while preferably 120 g/10 min or less, more preferably 80 g/10 min or less, still more preferably 40 g/10 min or less.

The MFR is a value determined in conformity with ASTM D 3307.

In the case where the fluoropolymer is ETFE, the molded article of the invention preferably has a tensile strength at break of 100 MPa or higher, more preferably 120 MPa or higher, still more preferably 130 MPa or higher.

In the case where the fluoropolymer is ETFE, the molded article of the invention preferably has an elastic modulus of 1 GPa or higher, more preferably 1.3 GPa or higher, still more preferably 1.5 GPa or higher, particularly preferably 1.6 GPa or higher.

In the case where the fluoropolymer is ETFE, the molded article of the disclosure preferably has a melting point of 255° C. or higher.

(PFA)

PFA is preferably, but is not limited to, a copolymer having a ratio by mole of a TFE unit and an PAVE unit (TFE unit/PAVE unit) of (70 to 99)/(30 to 1). The ratio by mole is more preferably (80 to 98.5)/(20 to 1.5), still more preferably (97 to 98.5)/(3 to 1.5). PEA is also preferably a copolymer containing 0.1 to 10 mol % of a monomer unit derived from a monomer copolymerizable with TFE and PAVE and 90 to 99.9 mol % in total of a TFE unit and a PAVE unit. Examples of the monomer copolymerizable with TFE and PAVE include HFP, a vinyl monomer represented by $CZ^3Z^4=CZ^5(CF)_nZ^6$ (wherein $Z^3$, $Z^4$, and $Z^5$ are the same as or different from each other and are each a hydrogen atom or a fluorine atom; $Z^6$ is a hydrogen atom, a fluorine atom, or a chlorine atom; and n is an integer of 2 to 10), a perfluoroalkyl vinyl ether derivative represented by $CF_2=CF-O-Rf^7$ (wherein $Rf^7$ is a C1-C5 perfluoroalkyl group), and an alkyl perfluorovinyl ether derivative represented by $CF_2=CF-OCH_2-Rf^7$ (wherein $Rf^7$ is a C1-C5 perfluoroalkyl group).

In the case where the fluoropolymer is PFA, the molded article of the invention preferably has a tensile strength at break of 30 MPa or higher. The tensile strength at break is more preferably 40 MPa or higher, still more preferably 45 MPa or higher.

PFA used in the disclosure preferably has a MFR of 0.1 g/10 min or more, more preferably 0.5 g/10 min or more, still more preferably 1.0 g/10 min or more, while preferably 120 g/10 min or less, more preferably 80 g/10 min or less, still more preferably 40 g/10 min or less. The MFR is a value determined in conformity with ASTM D 3307.

In the case where the fluoropolymer is PFA, the molded article of the invention preferably has an elastic modulus of 0.4 GPa or higher. The elastic modulus is more preferably 0.5 GPa or higher, still more preferably 0.7 GPa or higher, particularly preferably 0.8 GPa or higher.

In the case where the fluoropolymer is PFA, the molded article of the disclosure preferably has a melting point of 306° C. or higher, more preferably 310° C. or higher, still more preferably 312° C. or higher.

(FEP)

FEP is preferably, but is not limited to, a copolymer having a ratio by mole of a TFE unit and an HFP unit (TFE unit/HFP unit) of 70/30 or higher and lower than 99/1. The ratio by mole is more preferably 75/25 or higher and 98/2 or lower, still more preferably 80/20 or higher and 95/5 or lower. FEP is also preferably a copolymer containing 0.1 to 10 mol % of a monomer unit derived from a monomer copolymerizable with TE and HFP and 90 to 99.9 mol % in total of a TFE unit and a HFP unit. Examples of the monomer copolymerizable with TFE and HFP include PAVE and an alkyl perfluorovinyl ether derivative.

FEP used in the disclosure preferably has a MFR of 0.1 g/10 min or more, more preferably 0.5 g/10 min or more, still more preferably 1 g/10 min or more, while preferably 100 g/10 min or less, more preferably 40 g/10 min or less, still more preferably 30 or less.

The MFR is a value determined in conformity with ASTM D 3307.

In the case where the fluoropolymer is FEP, the molded article of the invention preferably has a tensile strength at break of 35 MPa or higher. The tensile strength at break is more preferably 40 MPa or higher, still more preferably 45 MPa or higher.

In the case where the fluoropolymer is FEP, the molded article of the invention preferably has an elastic modulus of 0.4 GPa or higher. The elastic modulus is more preferably 0.5 GPa or higher, still more preferably 0.6 GPa or higher, particularly preferably 0.7 GPa or higher.

In the case where the fluoropolymer is FEP, the molded article of the disclosure preferably has a melting point of 258° C. or higher, more preferably 265° C. or higher, still more preferably 272° C. or higher.

The amounts of the respective monomer units in the aforementioned copolymers can be calculated by appropriate combination of NMR, FT-IR, elemental analysis, and X-ray fluorescence analysis in accordance with the types of the monomers.

The fluoropolymer is obtainable by a conventionally known solution polymerization, suspension polymerization (dispersion polymerization), emulsion polymerization, or the like. A polymerization initiator to be used can be selected as appropriate from those conventionally used in accordance with the polymerization technique used.

Examples of the polymerization initiator include organic peroxides such as bis(chlorofluoroacyl)peroxide, bis(perfluoroacyl)peroxide, bis(ω-hydroperfluoroacyl)peroxide, t-butyl peroxyisobutyrate, and diisopropyl peroxydicarbonate; and azo compounds such as azobisisobutyronitrile. The polymerization initiator may be used in an amount that can be changed as appropriate in accordance with factors such as the type of the initiator and the polymerization reaction conditions. The amount thereof is usually 0.005 to 5% by weight, particularly about 0.05 to 0.5% by weight relative to all monomers to be polymerized.

The polymerization reaction conditions used may be wide range reaction conditions without limitation. For example, an optimal polymerization reaction temperature may be selected in accordance with the type of a polymerization initiator. The polymerization reaction temperature used may be usually about 0° C. to 100° C., particularly about 30° C. to 90° C. The reaction pressure may also be selected as appropriate, and is usually 0.1 to 5 MPa, particularly about 0.5 to 3 MPa. Polymerization for the fluoropolymer used in the invention can be advantageously performed at the above reaction pressure. Still, the polymerization may be performed at a higher pressure or under a reduced pressure condition. The polymerization type used may be either a batch type or continuous type, for example.

In order to adjust the molecular weight of the fluoropolymer, a chain transfer agent may also be used. The chain transfer agent used may be a common one. Examples thereof include hydrocarbons such as n-hexane and cyclohexane; aromatic compounds such as toluene and xylene; ketones such as acetone; acetates such as ethyl acetate and butyl acetate; alcohols such as methanol and ethanol; and mercaptans such as methyl mercaptan. The chain transfer agent may be used in an amount that varies in accordance with the chain transfer constant of a compound used. The amount thereof usually falls within the range of 0.01% by weight to 20% by weight relative to a polymerization solvent.

The polymerization solvent used may be a liquid solvent conventionally used in accordance with the polymerization technique used. In order to provide a molded article having excellent heat resistance, the fluoropolymer used in the invention is preferably formed by suspension polymerization (dispersion polymerization) in the presence of a fluorine-based solvent.

The fluoropolymer obtained by emulsion polymerization is preferably used with its unstable end of the polymer being stabilized into —$CF_3$ with fluorine gas.

The molded article of the invention may consist only of a fluoropolymer or may contain a component other than the fluoropolymer to the extent that the effects of the invention are not impaired.

The molded article of the invention may be a sheet, a tube, a fiber, or the like. Preferred is a sheet because it can be relatively easily produced.

The sheet may have any thickness that can be adjusted as appropriate by the amount of the material to be extruded, for example, in accordance with the intended use. Specifically, the thickness may preferably fall within the range of 1 μm to 10 mm, more preferably 2 μm to 5 mm, particularly preferably 3 μm to 1 mm.

The thickness of the sheet can be measured using a micrometer.

The molded article of the disclosure having the aforementioned structure has excellent mechanical strength and heat resistance, and thus can be used for a variety of applications.

For example, in the case where the fluoropolymer is a VdF/TFE copolymer, its excellent electric properties and ferroelectricity, as well as excellent mechanical strength and heat resistance, allow the molded article of the disclosure to be suitably used as an electret for piezoelectric films of microphones or speakers, films of piezoelectric sensors, high-speed switching devices, vibration-powered generators, imaging devices, wearable sensors, or electrowetting devices, and films of film capacitors. The molded article of the disclosure can also suitably be used as a pyroelectric film, for example.

In the case of PCTFE, which has excellent vapor barrier properties in addition to excellent mechanical strength and heat resistance, the molded article of the disclosure is suitable for chartula films, for example.

In the case of ETFE, which has excellent weather resistance in addition to excellent mechanical strength and heat resistance, the molded article of the disclosure is suitable for release films, building material sheets such as polytunnels, roof materials of buildings, lining materials of chemical liquid containers or tanks, lining materials of rubber closures, and the like.

In the case of PFA, which has excellent chemical resistance in addition to excellent mechanical strength and heat resistance, the molded article of the disclosure is suitable for fixing and pressure rollers, release films, lining materials of chemical liquid containers or tanks, wrapping electric wires, ribbon cables, and the like.

In the case of FEP, which has excellently low permittivity and dissipation factor in addition to excellent mechanical strength and heat resistance, the molded article of the disclosure is suitable for release films, insulating films, wrapping electric wires, ribbon cables, and the like.

The molded article of the disclosure can be suitably produced by the production method of the disclosure below. The production method of the disclosure can provide a molded article containing a fluoropolymer having a crystal size of 300 nm or smaller by elongational crystallization of the fluoropolymer.

The molded article obtainable by the production method of the disclosure can have an improved, for example, 2-fold or more improved, tensile strength at break in comparison with the fluoropolymer before elongational crystallization. The tensile strength at break is preferably as high as possible. The upper limit of the improvement of the tensile strength at break is usually about 8 times.

The fluoropolymer before elongational crystallization may have any shape. In order to achieve improved mechanical strength, melting point, and heat resistance, a sheet or a film is preferred.

The elongational crystallization is preferably performed by a method including:

melting the fluoropolymer by heating the fluoropolymer up to a maximum temperature $(t1)$ that is not lower than the melting point $(t0)$ of the fluoropolymer before elongational crystallization;

cooling the melted fluoropolymer down to 100° C. at a cooling rate $(r1)$;

elongationally crystallizing a fluoropolymer melt at a predetermined elongational strain rate $(R2)$ when the fluoropolymer melt reaches a temperature $(t2)$ in the cooling; and cooling down to room temperature the fluoropolymer that has been cooled down to 100° C.

The molded article obtained by the elongational crystallization has a sheet or film shape in most cases.

The maximum temperature $(t1)$ is any temperature that is not lower than the melting point of the fluoropolymer, and may be a temperature that is higher than the temperature $(t2)$ to be described later, for example.

For example, the maximum temperature $(t1)$ is preferably 5° C. or more, more preferably 10° C. or more, still more preferably 35° C. or more higher than the melting point of the fluoropolymer.

The upper limit of the maximum temperature $(t1)$ may be any temperature at which the fluoropolymer may not be impaired, and may be 100° C. higher than the melting point of the fluoropolymer, for example.

The cooling rate $(r1)$ is preferably 0.1 K/min or higher and 500 K/min or lower, more preferably 1 K/min or higher and 300 K/min or lower. Too low a cooling rate $(r1)$ may cause a failure in improving the mechanical strength of the resulting molded article. Too high a cooling rate $(r1)$ may cause difficulty in control of the elongational crystallization temperature.

The temperature $(t2)$ is the temperature at which elongational crystallization of the fluoropolymer starts, and is lower than $(t0+35°)$ C and higher than $(t0-35°)$ C. In order to allow the tensile strength at break to be 2.0 times or higher the tensile strength at break of the fluoropolymer before elongational crystallization, the temperature $(t2)$ is more preferably lower than $(t0+15°)$ C and higher than $(t0-20°)$ C. Too high a temperature $(t2)$ may cause a failure in improving the crystallinity and mechanical strength. Too low a temperature $(t2)$ may cause difficulty in elongational crystallization.

The elongational crystallization can be performed using a pressing device or sandwiching rollers. The pressing device suitably used in the production method of the disclosure may be a pressing device including a pair of upper and lower mold halves which face each other and are provided with a heater for heating the fluoropolymer, a cooler for cooling the fluoropolymer, and a temperature detector for detecting the temperature of a mold. The mold halves each preferably have a flat plate shape so as to easily compress the fluoropolymer uniformly at a desired rate. In the pressing device, preferably, the heater is an internal heater built in a mold half and the cooler is configured to perform cooling by flowing a coolant such as water or air in a tube built in a mold half. In the pressing device, the presence of the temperature detector built in near the pressing surface of a mold half allows the temperature of the mold detected by the temperature detector and the temperature $(t)$ of the fluoropolymer to be substantially the same temperature.

The sandwiching rollers suitably used in the invention may be a rolling device including a pair of upper and lower metal rollers which face each other and are provided with a heater for heating the fluoropolymer, a cooler for cooling the fluoropolymer, and a temperature detector for detecting a roller temperature.

Elongational crystallization using the pressing device may be performed by, for example, a method including:

placing a fluoropolymer between the pair of the upper and lower mold halves;

melting the fluoropolymer by heating the fluoropolymer with the heater up to a maximum temperature $(t1)$ that is not lower than the melting point $(t0)$ of the fluoropolymer;

cooling the melted fluoropolymer down to 100° C. with the cooler at a cooling rate $(r1)$;

elongationally crystallizing the fluoropolymer by moving the lower mold half toward the upper mold half at an elongational strain rate (R2) when the mold half temperature detected by the temperature detector reaches a temperature (t2) in the cooling; and cooling down to room temperature the fluoropolymer that has been cooled down to 100° C.

Figure 2:
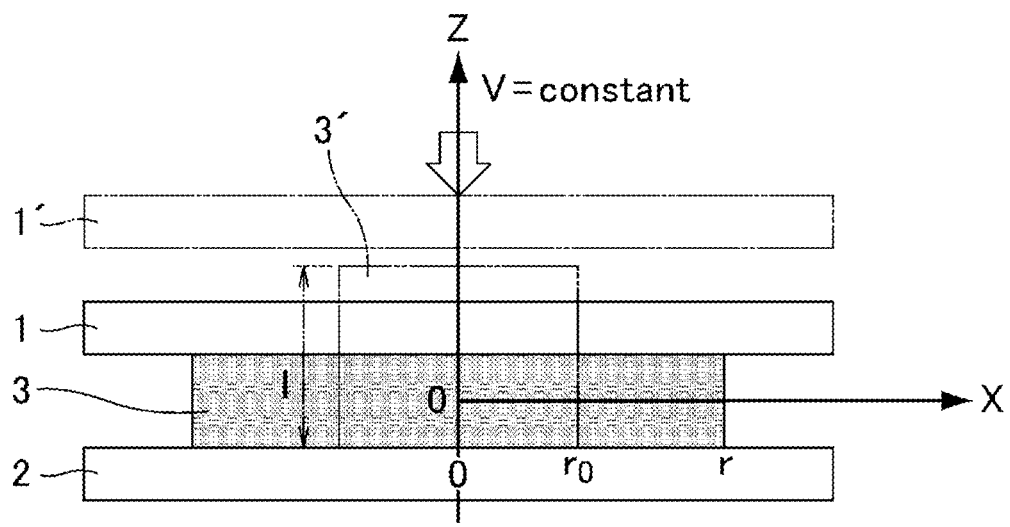
FIG. 2 is a schematic side view of a pressing device used in production of the molded article of the disclosure.

The above method can be performed using the device as illustrated in FIG. 2, for example.

The elongational strain rate (R2) of the elongational crystallization using the pressing device is preferably 40 s$^{-1}$ or higher and 4000 s$^{-1}$ or lower. An elongational strain rate (R2) within this range allows the tensile strength at break to be twice or more that of the fluoropolymer before compression.

Too low an elongational strain rate (R2) tends to cause a reduced tensile strength at break of the resulting highly crystalline molded article. Too high an elongational strain rate (R2) may apply an excessive impact to the fluoropolymer, resulting in a broken molded article.

The elongational strain rate (R2) can be adjusted by adjusting the charge pressure of an accumulator for moving the lower mold half of the above pressing device, for example.

In the case of a cylindrical fluoropolymer sample with the upper and bottom faces each being a perfect circle, the elongational strain rate (R2) can be calculated by R2=r$^2$V/(r$_0^2$l). In the formula, V (mm/s) is the compression rate in the thickness direction, l (mm) is the thickness of the sample before elongational crystallization, r$_0$ (mm) is the distance from the center of the sample before elongational crystallization, and r (mm) is the distance from the center of the molded article after elongational crystallization (see FIG. 2).

Elongational crystallization using the sandwiching rollers may be performed by a method including:

placing a fluoropolymer on one of the rollers facing each other;

melting the fluoropolymer by heating the fluoropolymer with the heater up to a maximum temperature (t1) that is not lower than the melting point (t0) of the fluoropolymer;

cooling the melted fluoropolymer down to a temperature (t2) detected by the temperature detector with the cooler;

elongationally crystallizing the fluoropolymer at an elongational strain rate (R2) by moving the pair of rollers at a roller rotating rate (Vi) and narrowing the roller-to-roller distance when the roller temperature reaches the temperature (t2); and cooling the fluoropolymer down to room temperature.

Figure 3:
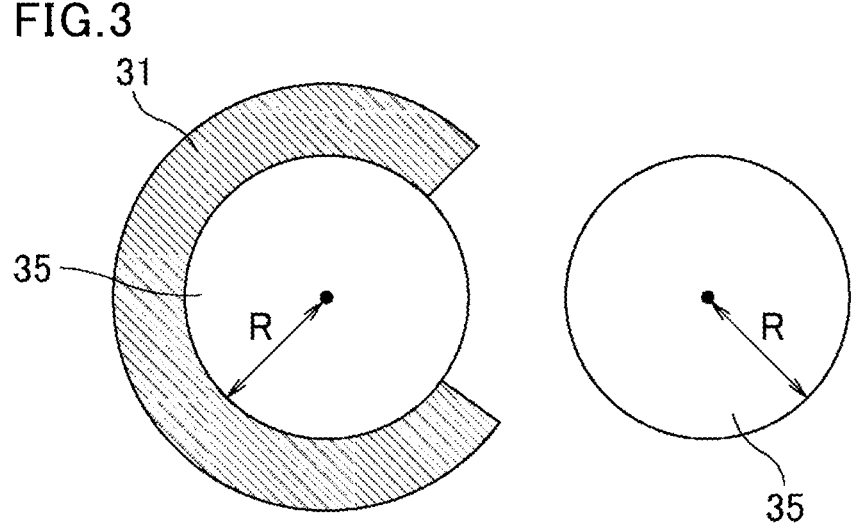
FIG. 3 is a schematic view of a method for producing the molded article of the disclosure using a rolling device (sandwiching rollers).
Figure 4:
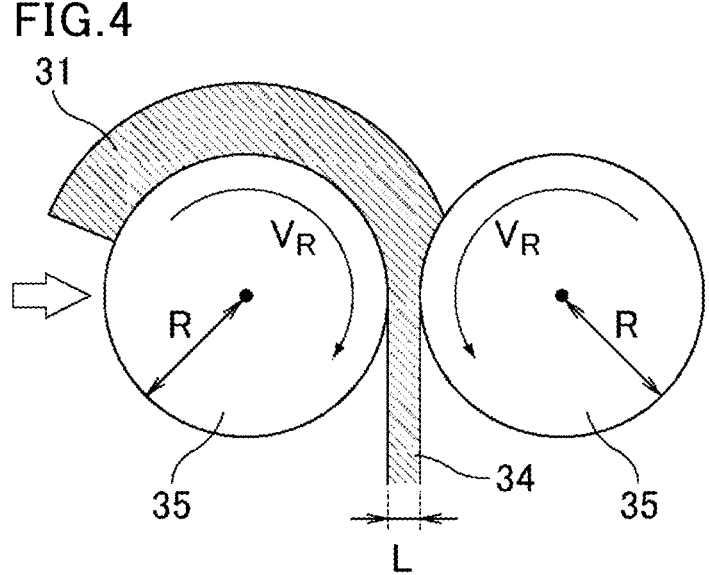
FIG. 4 is a schematic view of a method for producing the molded article of the disclosure using the rolling device (sandwiching rollers).

The above method can be performed using a device as illustrated in FIGS. 3 and 4, for example.

For example, elongational crystallization using the sandwiching rollers may be continuously performed using a device including a supercooled melt feeder (including an extruder that melts the fluoropolymer and feeds a melt of the fluoropolymer and a cooling adaptor that cools the melt fed from the extruder into a supercooled state) and sandwiching rollers. The extruder of the supercooled melt feeder is provided with a slit die at an outlet thereof, and the slit die has a quadrangular end. The fluoropolymer melt discharged through the slit die is cooled into a supercooled state while passing through the cooling adaptor (the melt in a cooled state is referred to as a "supercooled melt"), and the supercooled melt is discharged toward the sandwiching rollers. The sandwiching rollers are provided such that paired rotatable rollers face each other, and are configured to sandwich the supercooled melt fed from the supercooled melt feeder and elongate the supercooled melt in the rotating direction of the rollers to mold the supercooled melt into a sheet shape.

The elongational strain rate (R2) in the elongational crystallization using the sandwiching rollers is preferably 4 s$^{-1}$ or higher and 1000 s- or lower. An elongational strain rate (R2) within this range allows the tensile strength at break to be twice or higher that of the fluoropolymer before compression.

Too low an elongational strain rate (R2) tends to cause a reduced tensile strength at break of the resulting highly crystalline molded article. Too high an elongational strain rate (R2) may apply an excessive impact to the fluoropolymer, resulting in a broken molded article.

The elongational strain rate (R2) can be controlled by the roller rotating rate (V$_R$) of the rolling device.

The elongational strain rate (R2) can be calculated by R2 V$_R$/(RL)$^{1/2}$. R is the radius of each roller and L is the thickness of the molded article after elongational crystallization (see FIG. 4).

EXAMPLES

The invention will be described hereinbelow with reference to examples. Still, the invention is not intended to be limited by these examples.

The following fluoropolymers were used in the examples.
(ETFE)
Ethylene/TFE copolymer, trade name: EP546, available from Daikin Industries, Ltd.
(VdF/TFE copolymer (1))
VdF/TFE=80/20 (ratio by mole)
(VdF/TFE copolymer (2))
VdF/TFE=93/7 (ratio by mole)
(PCTFE)
Polychlorotrifluoroethylene homopolymer, trade name: M300H, available from Daikin Industries, Ltd., flow value: 1.5×10$^{-3}$ cc/s (230° C., 980 N, nozzle diameter: 1 mmφ)
(PFA)
TFE/PPVE copolymer, trade name: AP230, available from Daikin Industries, Ltd., MFR: 2 (g/10 min)
(FEP)
TFE/HFP copolymer, trade name: NP30, available from Daikin Industries, Ltd., MFR: 3 (g/10 min)

The MFR is a value determined in conformity with ASTM D 3307. The flow value of PCTFE is a value determined using a Koka flowtester.

The evaluations in the examples and the comparative example were performed by the following methods.

(1) Observation with Polarization Microscope

The samples obtained in the examples were observed using a polarization microscope. The polarization microscope used was BX51 available from Olympus Corp. and the observation was performed in crossed nicols. In order to quantitatively measure the change in retardation, a sensitive color test plate was inserted between a polarizer and an analyzer (polarizing plate) of the polarization microscope (Reference: Kobunshi Sozai no Henko Kenbikyo Nyumon (Introduction to polarization microscope for polymer material), Yu Awaya, AGNE Gijutsu Center Inc., 2001, p. 75-103). The observation with the polarization microscope was performed at room temperature, 25° C. Each sample was observed in the sheet thickness direction (ND, through direction).

(2) X-Ray Diffraction (Small-Angle X-Ray Scattering)

The samples were observed by SAXS. SAXS was performed in conformity with "Kobunshi Ekkusu-sen Kaisetsu (Polymer X-ray diffraction)", Masao Kakudo, Nobutami Kasai, Maruzen Publishing Co., Ltd., 1968, and "Kobunshi Ekkusu-sen Kaisetsu (Polymer X-ray diffraction)", edition 3.3, Toru Masuko, Yamagata University Co-op, 1995. More specifically, two-dimensional small-angle X-ray scattering measurement was performed with an X-ray diffraction device (NANO Viewer, available from Rigaku Corp.) at an X-ray wavelength λ of 0.1542 nm, a camera length of 1 m, and room temperature, 25° C., using a two-dimensional semiconductor X-ray detector as a detector. The observation was performed in the direction (through) perpendicular to MD and TD. The time period during which the samples were exposed to X-rays was 10 minutes.

Two-dimensional small-angle X-ray scattering measurement with higher definition was performed with Beamline BL40B2 at Japan Synchrotron Radiation Research Institute (JASRI), SPring-8, at an X-ray wavelength N of 0.15 nm, a camera length of 3 m, and room temperature, 25° C., using an imaging plate as a detector. The observation was performed in the direction (through) perpendicular to MD and TD. The time period during which the samples were exposed to X-rays was 180 seconds. The imaging plate was scanned with a scanning device available from Rigaku Corp. and reading software (2DP, available from Rigaku Corp.), and thereby a two-dimensional image was obtained.

One-dimensional small-angle scattering measurement was performed with an X-ray scattering measurement device (RINT-2500, available from Rigaku Corp.) at an X-ray wavelength λ of 0.1542 nm, a camera length of 0.3 m, and room temperature, 25° C., in the direction (through) perpendicular to MD and TD.

(3) X-Ray Diffraction (Wide-Angle X-Ray Scattering)

The samples were observed by WAXS. WAXS was performed with an X-ray diffraction device (R-Axis VII, available from Rigaku Corp.) at an X-ray wavelength (A) of 0.07107 nm, a camera length of 890 mm, and room temperature, 25° C., in the through direction with a time period during which the samples were exposed to X-rays of 10 minutes.

(4) Crystal Size and Structure of NOCs

The crystal size (d) of PCTFE was determined from the two-point image in MD of the small-angle X-ray scattering image. The crystal size (d) of each of ETFE, the VdF/TFE copolymer, and PEA was determined from the scattering vector (q) in MD of the small-angle X-ray scattering image. The primary peak of a scattering vector (q)-small-angle X-ray scattering intensity (Ix) curve in SAXS corresponds to the shortest distance between microcrystals (=crystal size d) in cases where microcrystals having an average size d are randomly packed (reference: A. Guinier, "Ekkusu-sen Kessho-gaku no Riron to Jissai (Theory and Practice of X-ray crystallography)", Rigaku Corp., p 513, 1967). Thus, the crystal size d is calculated by the Bragg equation.

$$d = 2\pi \div q \qquad \text{Bragg equation:}$$

(5) Heatproof Temperature

The heatproof temperature of each of the samples according to the examples and the comparative example were measured by test-piece size direct reading using an optical microscope. Specifically, the test piece (0.6 mm in length, 0.4 or 0.7 mm in width) was placed in a hot stage using a heat stretching stage (Linkam Tensile Testing System TST350, System Controllers T95-PE) for an optical microscope and software (Linksys 32 System Control and ImagenCapture Software). The test piece was heated up to 150° C. at a temperature-increasing rate of 10 K/min, maintained at 150° C. for 30 minutes, and then heated at a rate of 10 K/min. In the measurement, image analysis software (Linksys 32 System Control and Image Capture Software) that can quantify the size on a display was used for observation and recording. The longitudinal direction (MD) and the transverse direction (TD) of the test piece were quantitatively measured. The temperature at which the test piece started to shrink (or expand) by 3% or more in MD or TD was defined as the heatproof temperature $T_H$.

(6) Melting Point

The melting point of the molded article was the temperature corresponding to the maximum value on a heat-of-fusion curve drawn by increasing the temperature at a rate of 10 K/min using a differential scanning calorimeter (DSC).

(7) Tensile Stress at Break

The tensile stress at break was determined in conformity with JIS-7127.

(8) Tensile Modulus

The tensile modulus was a value determined by the method in conformity with JIS-7127.

Production of Melt-Press Sample Used in Pressing Elongational Crystallization Experiment Production Example 1

A 9.8-g portion of the ethylene-tetrafluoroethylene copolymer (trade name: EP546, available from Daikin Industries, Ltd.) was weighed and sandwiched between φ60-mm upper and lower mold halves. The copolymer was heated at 300° C. for 20 minutes, and then the air therein was removed by repeating a cycle of compression at 300° C. and 1 MPa and decompression five times. The copolymer was then maintained in a compressed state at 300° C. and 3 MPa for three minutes, followed by water cooling at 3 MPa for 10 minutes. Thereby, an ethylene-tetrafluoroethylene copolymer sheet having a thickness of 2.2 mm was obtained.

Production Example 2

A 20-g portion of the VdF/TFE copolymer (1) was weighed and sandwiched between φ120-mm upper and lower mold halves. The copolymer was heated at 190° C. for 20 minutes, and then the air therein was removed by repeating a cycle of compression at 190° C. and 2 MPa and decompression five times. The copolymer was then maintained in a compressed state at 190° C. and 2 MPa for one minute, followed by water cooling at 2 MPa for 10 minutes. Thereby, a VdF/TFE copolymer sheet (1) having a thickness of 1.1 mm was obtained.

Production Example 3

A 20-g portion of the VdF/TFE copolymer (2) was weighed and sandwiched between φ120-mm upper and lower mold halves. The copolymer was heated at 190° C. for 20 minutes, and then the air therein was removed by repeating a cycle of compression at 190° C. and 2 MPa and decompression five times. The copolymer was then maintained in a compressed state at 190° C. and 2 MPa for one minute, followed by water cooling at 2 MPa for five minutes. Thereby, a VdF/TFE copolymer sheet (2) having a thickness of 1.1 mm was obtained.

Production Example 4

A 4.8-g portion of the polychlorotrifluoroethylene homopolymer (trade name: M300H, available from Daikin Industries, Ltd.) was weighed and sandwiched between φ60-mm upper and lower mold halves. The copolymer was heated at 280° C. for 20 minutes, and then the air therein was removed by repeating a cycle of compression at 280° C. and 3 MPa and decompression five times. The copolymer was then maintained in a compressed state at 280° C. and 3 MPa for five minutes, followed by water cooling at 3 MPa for five minutes. Thereby, a polychlorotrifluoroethylene homopolymer sheet having a thickness of 0.78 mm was obtained.

Production Example 5

A 14-g portion of the TFE/PPVE copolymer (trade name: AP230, available from Daikin Industries, Ltd.) was weighed and sandwiched between φ60-mm upper and lower mold halves. The copolymer was heated at 360° C. for 20 minutes, and then the air therein was removed by repeating a cycle of compression at 360° C. and 3 MPa and decompression five times. The copolymer was then maintained in a compressed state at 360° C. and 3 MPa for three minutes, followed by water cooling at 3 MPa for 15 minutes. Thereby, a TFE/PPVE copolymer sheet having a thickness of 2.3 mm was obtained.

Production Example 6

A 7.9-g portion of the TFE/HFP copolymer (trade name: NP30, available from Daikin Industries, Ltd.) was weighed and sandwiched between φ60-mm upper and lower mold halves. The copolymer was heated at 330° C. for 20 minutes, and then the air therein was removed by repeating a cycle of compression at 330° C. and 3 MPa and decompression five times. The copolymer was then maintained in a compressed state at 330° C. and 3 MPa for three minutes, followed by water cooling at 3 MPa for 15 minutes. Thereby, a TFE/HFP copolymer sheet having a thickness of 1.3 mm was obtained.

Pressing Elongational Crystallization Experiment

Example 1

Using a pressing device illustrated in FIG. 2, a φ10-mm 2.2-mm-thick ethylene-tetrafluoroethylene copolymer (trade name: EP546, available from Daikin Industries, Ltd.) was heated up to 305° C. at a rate of 10 K/min to be melted, maintained for five minutes, and then cooled down to 100° C. at 208 K/min. At 235° C. during this cooling process, the copolymer was rolled at a compression rate of 230 mm/s, whereby an elongationally crystallized film-shaped molded article was obtained. The elongational strain rate at an end of the molded article was 1366 s$^{-1}$.

The production conditions are shown in Table 1 and the measurement results of the molded article are shown in Table 2.

Examples 2 to 7, 13, and 14

An elongationally crystallized film-shaped molded article was obtained as in Example 1, except that the fluoropolymer and the conditions were changed as shown in Table 1 and the thickness of the sample before pressing was changed to 1.1 mm for the VdF/TFE copolymer, 0.78 mm for the polychlorotrifluoroethylene homopolymer, 2.3 mm for the TFE/PPVE copolymer, and 1.3 mm for the TFE/HFP copolymer. The production conditions are shown in Table 1 and the measurement results of the molded article are shown in Table 2.

Production of Melt-Press Sample Used in Rolling Elongational Crystallization Experiment Production Example 7

A 11-g portion of the VdF/TFE copolymer (1) was weighed and sandwiched between φ120-mm upper and lower mold halves. The copolymer was heated at 190° C. for 20 minutes, and then the air therein was removed by repeating a cycle of compression at 190° C. and 2 MPa and decompression five times. The copolymer was then maintained in a compressed state at 190° C. and 2 MPa for one minute, followed by water cooling at 2 MPa for 10 minutes. Thereby, a sheet of the VdF/TFE copolymer (1) having a thickness of 0.5 mm was obtained.

Production Example 8

A 11-g portion of the VdF/TFE copolymer (2) was weighed and sandwiched between φ120-mm upper and lower mold halves. The copolymer was heated at 190° C. for 20 minutes, and then the air therein was removed by repeating a cycle of compression at 190° C. and 2 MPa and decompression five times. The copolymer was then maintained in a compressed state at 190° C. and 2 MPa for one minute, followed by water cooling at 2 MPa for five minutes. Thereby, a sheet of the VdF/TFE copolymer (2) having a thickness of 0.5 mm was obtained.

Example 8

A 12-g portion of the polychlorotrifluoroethylene homopolymer (trade name: M300H, available from Daikin Industries, Ltd.) was weighed and sandwiched between φ120-mm upper and lower mold halves. The copolymer was heated at 280° C. for 20 minutes, and then the air therein was removed by repeating a cycle of compression at 280° C. and 3 MPa and decompression five times. The copolymer was then maintained in a compressed state at 280° C. and 3 MPa for five minutes, followed by water cooling at 3 MPa for five minutes. Thereby, a polychlorotrifluoroethylene homopolymer sheet having a thickness of 0.5 mm was obtained.

Using a sandwiching roller device illustrated in FIGS. 3 and 4, a PCTFE sheet having a size of 8 cm in length, 3 cm in width, and 0.5 mm in thickness was placed with the longitudinal direction corresponding to the roller rotating direction. The sheet was melted at 250° C. and maintained for five minutes, cooled down to 215° C. at 3 K/min, and then rolled at a roller rotating rate of 40 m/min. Thereby, an elongationally crystallized film-shaped molded article was obtained. The elongational strain rate at an end of the molded article was 326 s$^{-1}$.

The radius R of each roller was 100 mm, $V_R$ was 40 m/min, and L was 0.042 mm.

The production conditions are shown in Table 3 and the measurement results of the molded article are shown in Table 4.

Examples 9 to 12

An elongationally crystallized film-shaped molded article was obtained as in Example 8, except that the fluoropolymer and the conditions were changed as shown in Table 3.

Comparative Example 1

A PCTFE film (trade name: DF-0025C1, available from Daikin Industries, Ltd.) was used for the respective measurements.

TABLE 1

| | Fluoropolymer | Melting point of fluoropolymer (t0)/° C. | Maximum temperature (t1)/° C. | Cooling rate (r1)/Kmin⁻¹ | Temperature (t2)/° C. | Compression rate (V)/mms⁻¹ | Elongational strain rate (R2)/s⁻¹ |
|---|---|---|---|---|---|---|---|
| Example 1 | ETFE | 253 | 305 | 208 | 235 | 230 | 1366 |
| Example 2 | VdF/TFE copolymer (1) | 137 | 158 | 126 | 115 | 230 | 1512 |
| Example 3 | VdF/TFE copolymer (2) | 150 | 206 | 172 | 130 | 230 | 1742 |
| Example 4 | PCTFE | 214 | 266 | 200 | 195 | 360 | 3138 |
| Example 5 | PFA | 305 | 346 | 210 | 300 | 230 | 1320 |
| Example 6 | FEP | 266 | 319 | 242 | 260 | 360 | 2092 |
| Example 7 | FEP | 266 | 325 | 31 | 260 | 230 | 973 |
| Example 13 | PCTFE | 214 | 256 | 208 | 200 | 230 | 402 |
| Example 14 | VdF/TFE copolymer (1) | 137 | 158 | 126 | 140 | 230 | 1826 |

TABLE 2

| | Fluoropolymer | Tensile stress at break ($\sigma_B$)/MPa | Tensile modulus ($E_f$)/GPa | Melting point of elongationally crystallized molded article (Tm)/° C. | Heatproof temperature $T_H$/° C. | Crystal size/nm |
|---|---|---|---|---|---|---|
| Example 1 | ETFE | 131 | 1.85 | 255 | — | 21 |
| Example 2 | VdF/TFE copolymer (1) | 149 | 1.25 | 137 | — | 29 |
| Example 3 | VdF/TFE copolymer (2) | 210 | 1.05 | 167 | 164 | 56 |
| Example 4 | PCTFE | 123 | 1.2 | 219 | — | 38 |
| Example 5 | PFA | 47 | 0.8 | 312 | — | 44 |
| Example 6 | FEP | — | — | 272 | — | 32 |
| Example 7 | FEP | 45 | 0.70 | 289 | — | 26 |
| Example 13 | PCTFE | 104 | 1.5 | 218 | — | 56 |
| Example 14 | VdF/TFE copolymer (1) | — | — | 137 | — | 42 |

TABLE 3

| | Fluoropolymer | Melting point of fluoropolymer before rolling (t0)/° C. | Maximum temperature (t1)/° C. | Cooling rate (r1)/Kmin⁻¹ | Temperature (t2)/° C. | Roller rotating rate (V)/mmin⁻¹ | Elongational strain rate (R2)/s⁻¹ | Sample thickness (L)/mm |
|---|---|---|---|---|---|---|---|---|
| Example 8 | PCTFE | 214 | 250 | 3 | 215 | 40 | 326 | 42 |
| Example 9 | PCTFE | 214 | 250 | 3 | 210 | 40 | 342 | 38 |
| Example 10 | PCTFE | 214 | 250 | 3 | 215 | 10 | 78 | 45 |
| Example 11 | VdF/TFE copolymer (1) | 138 | 180 | 2 | 134 | 10 | 136 | 20 |
| Example 12 | VdF/TFE copolymer (2) | 150 | 190 | 3 | 135 | 40 | 406 | 38 |

TABLE 4

| | Fluoropolymer | Tensile stress at break ($\sigma_B$)/MPa | Tensile modulus ($E_f$)/GPa | Melting point (Tm)/° C. | Heatproof Temperature ($T_H$)/° C. | Crystal size (d)/nm |
|---|---|---|---|---|---|---|
| Example 8 | PCTFE | 213 | 1.6 | 232 | — | 55 |
| Example 9 | PCTFE | 360 | 2.0 | 230 | — | 56 |
| Example 10 | PCTFE | 219 | 1.6 | 229 | 180 | 61 |
| Example 11 | VdF/TFE copolymer (1) before rolling | 32 | 0.29 | 137 | — | — |
| | VdF/TFE copolymer (1) | 151 | 1.4 | 141 | 135 | — |
| Example 12 | VdF/TFE copolymer (2) before rolling | 43 | — | 150 | — | — |
| | VdF/TFE copolymer (2) | 116 | 1.2 | 165 | — | 46 |

Observation with Polarization Microscope

Figure 5A:
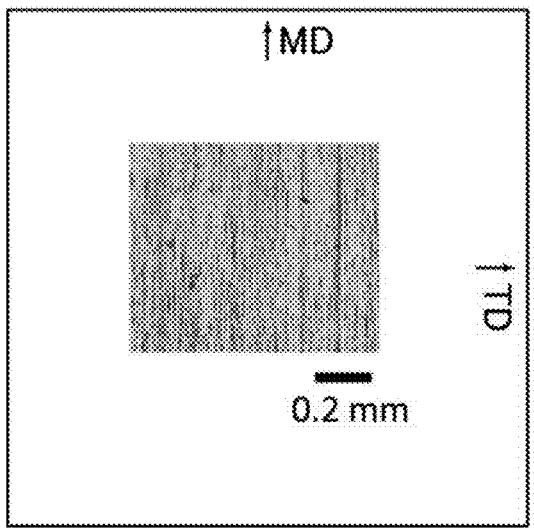
FIGS. 5(a) and 5(b) include polarization microscopic images (results of observation in the through direction) of a sample in an example.
Figure 5B:
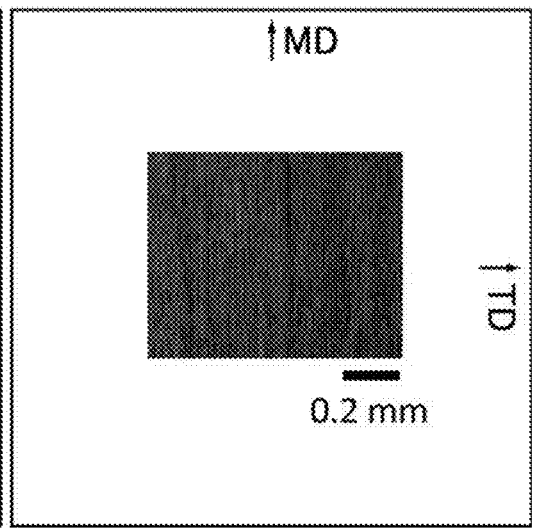

The samples obtained above were observed using a polarization microscope in the sheet thickness direction (ND, through direction). FIGS. 5(a) and 5(b) show the results of observation using a polarization microscope on the PCTFE sample obtained in Example 9 as a representative example of the samples according to the examples. FIG. 5(a) is a polarization microscopic image of the sample with MD parallel to a sensitive color test plate and FIG. 5(b) is a polarization microscopic image of the sample at an extinction angle.

As the sample was rotated with the sensitive color test plate being inserted, the color in the elongational direction (MD) (i.e., retardation) changed from reddish purple to yellow (FIG. 5(a)), and then to reddish purple, exhibiting a clear extinction angle (reddish purple) (FIG. 5(b)). Thus, this change in retardation demonstrates that the polymer chain of the sample in the example is oriented in the elongational direction (MD).

X-Ray Diffraction (Small-Angle X-Ray Scattering)

Figure 6:
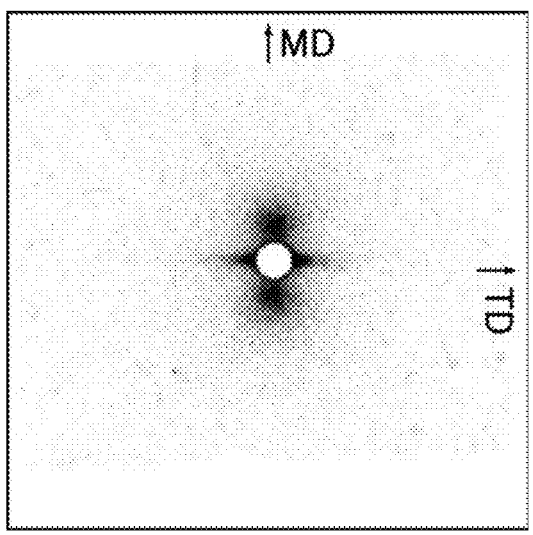
FIG. 6 is a small-angle X-ray scattering image of a sample in an example.

The samples in the examples were observed by SAXS. FIG. 6 shows the SAXS image of the PCTFE sample obtained in Example 10 as a representative example of observation using an X-ray diffraction device (NANO Viewer, available from Rigaku Corp.). FIGS. 12, 13, 14, 15, 16, and 17 respectively show Examples 13, 1, 14, 3, 8, and 9 as representative examples of observation using Beamline BL40B2 at SPring-8. FIGS. 6 and 12 to 17 are observation results in the through direction. Intensive two-point images were observed in MD. This proves that the crystals (NCs) of the samples in the examples are oriented in MD. This demonstrates that the samples in the examples each form NOCs.

X-Ray Diffraction (Wide-Angle X-Ray Scattering)

Figure 7:
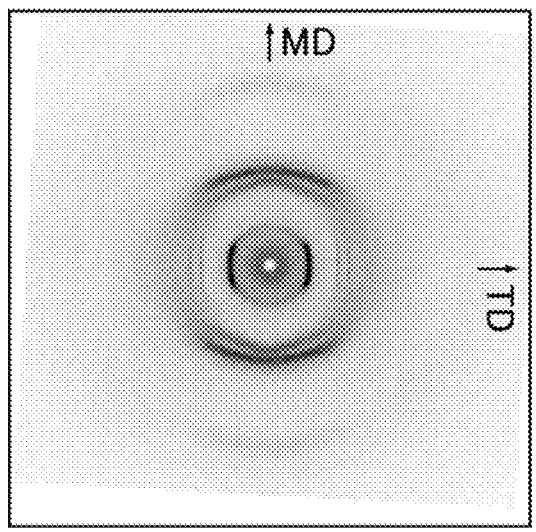
FIG. 7 is a wide-angle X-ray scattering image of the sample in the example.

The samples in the examples were observed by WAXS. FIG. 7 shows the WAXS image of the PCTFE sample obtained in Example 10 as a representative example. FIG. 7 shows an observation result in the through direction. FIG. 7 shows a fiber pattern, which means that the polymer chain (c-axis of crystal) is highly oriented in MD. This demonstrates that the sample in the example forms NOCs.

Crystal Size and Structure of NOCs

The crystal size (d) of a sample in an example of PCTFE was determined from the two-point image in MD of FIG. 6. The crystal size d of the PCTFE sample obtained in Example 10, taken as a representative example of the PCTFE samples in the examples, was found to be 61 nm. Similarly, the crystal size (d) in Examples 13, 1, 14, 3, 8, and 9 were determined respectively from the two-point images of FIGS. 12, 13, 14, 15, 16, and 17. The crystal size d was 56 nm in Example 13, 21 nm in Example 1, 42 nm in Example 14, 56 nm in Example 3, 55 nm in Example 8, and 56 nm in Example 9.

The crystal size (d) was determined from the scattering vector q obtained by one-dimensional small-angle scattering measurement on each of the samples of Examples 2, 4, 5, 6, 7, and 12. The crystal size d of the sample was 29 nm in Example 2, 38 nm in Example 4, 44 nm in Example 5, 32 nm in Example 6, 26 nm in Example 7, and 49 nm in Example 12.

The results of microscopic observation and X-ray observation lead to a presumption that the fluoropolymer samples in the examples each have a structure in which substantially spherical NCs as illustrated in FIG. 1 are arranged in a paracrystalline manner in MD.

Heatproof Temperature

The heatproof temperatures of the sample of the VdF/TFE copolymer (2) in Example 3, the sample of the VdF/TFE copolymer (1) in Example 11, the sample of PCTFE in Example 10, and the sample of PCTFE in Comparative Example 1 (trade name: DF-0025C1, available from Daikin Industries, Ltd.) were measured by test-piece size direct reading using an optical microscope. The longitudinal direction (MD) and the transverse direction (TD) of each test piece were quantitatively measured. The temperature at which the test piece started to shrink (or expand) by 3% or more in MD or TD was defined as the heatproof temperature $T_H$.

The sample of the VdF/TFE copolymer (2) in Example 3 had a heatproof temperature $T_H$ of 164° C., and thus had high heat resistance. The molded article of the VdF/TFE copolymer (1) had a heatproof temperature $T_H$ of 135° C., and thus had high heat resistance.

Figure 8:
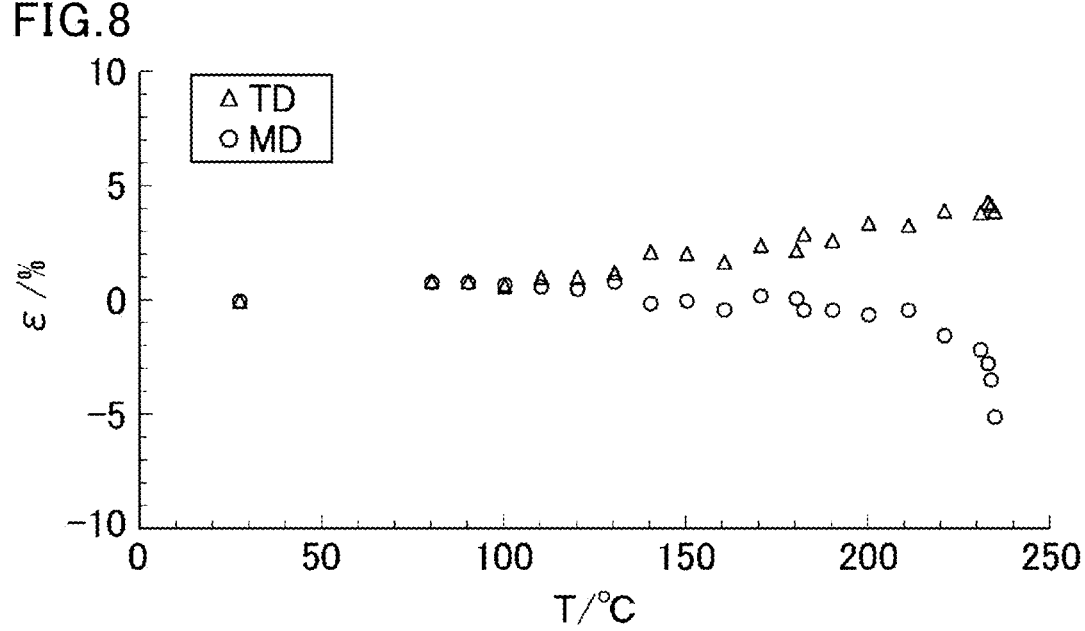
FIG. 8 is a diagram of the results of measuring the heat resistance in an example of PCTFE.
Figure 9:
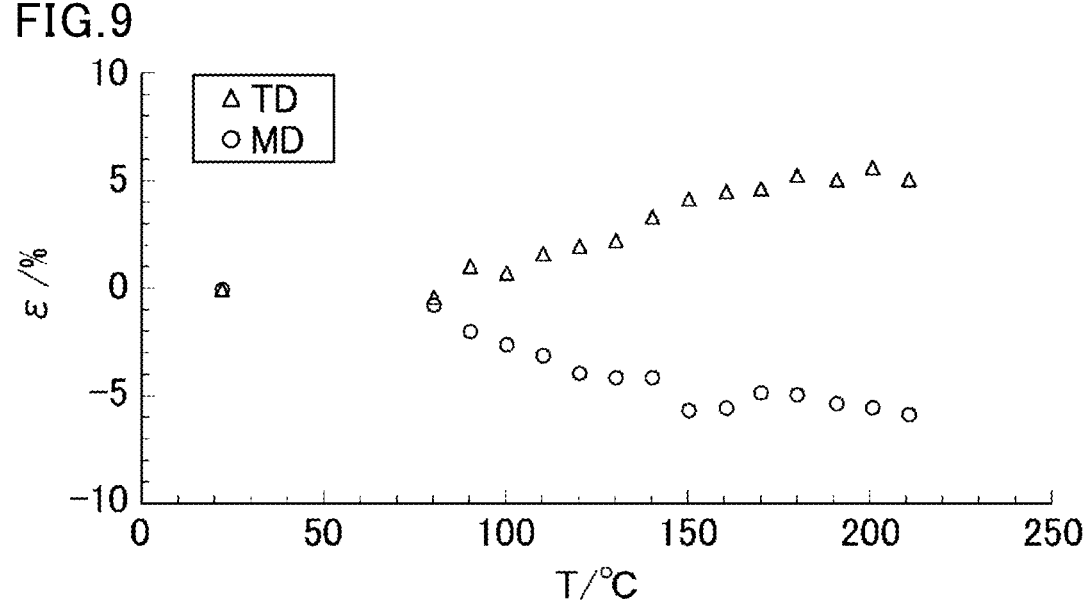
FIG. 9 is a diagram of the results of measuring the heat resistance in the comparative example.

FIG. 8 shows the results of measuring the heat resistance of the PCTFE sample in Example 10. FIG. 9 shows the results of measuring the heat resistance of PCTFE in Comparative Example 1. The heatproof temperature $T_H$ at which the sample of Example 10 deformed by 3% or more was about 180° C. The heatproof temperature $T_H$ of the PCTFE sample in Comparative Example 1 was about 110° C. This demonstrates that the heatproof temperature of the sample in the example was greatly higher than that of the sample in the comparative example.

Melting Point

The melting points $T_m$ of the samples in the examples and the melting points t0 of the samples relating to the sheets used for elongational crystallization were each determined as the temperature corresponding to the maximum value on a heat-of-fusion curve drawn by increasing the temperature at a rate of 10 K/min using a differential scanning calorimeter (DSC). The results are shown in Tables 2 and 4.

The molded article of PCTFE had a melting point Tm that is +4° C. higher than the equilibrium melting point $T_m^0$=228° C. at rest that has been reported previously (M. Hikosaka et al. Polymer Preprints, Japan 1989, 38 (10), 3308-3310).

The samples in the examples were found to have a greatly higher melting point than the samples relating to the sheets before elongational crystallization.

Tensile Stress at Break, Tensile Modulus

Figure 10:
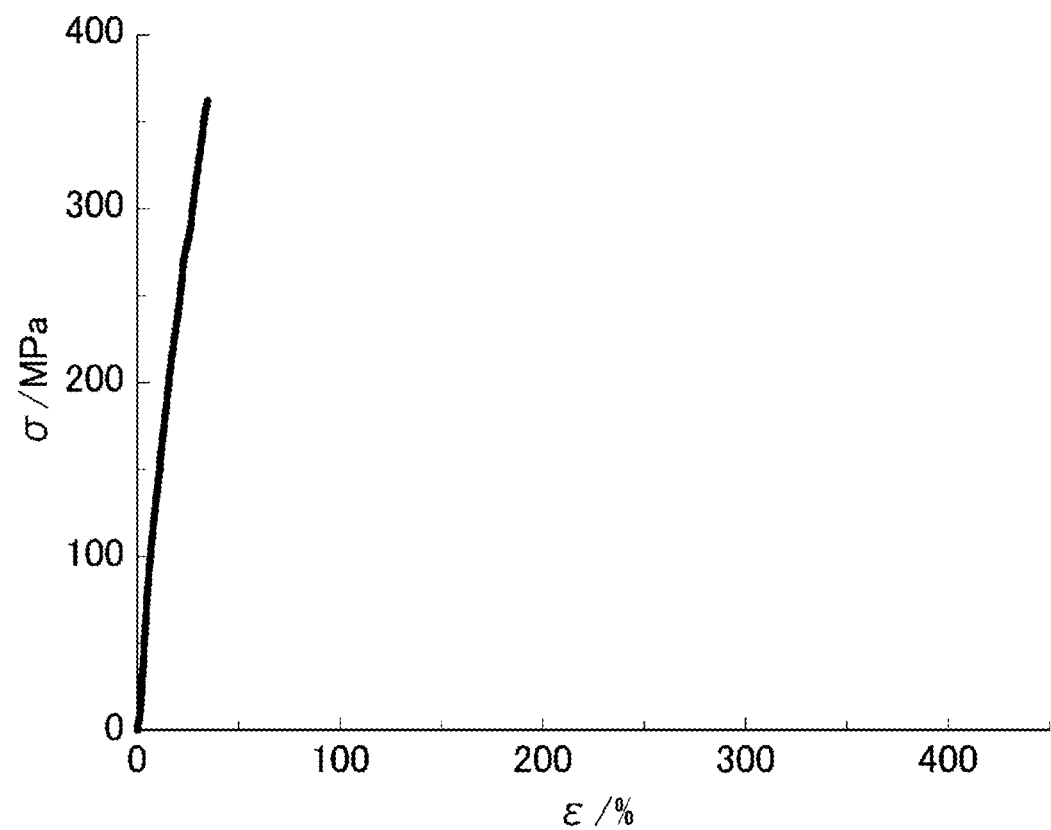
FIG. 10 is a typical diagram of the results of measuring the tensile stress at break ($\sigma_B$) and the tensile modulus ($E_t$) of a sample in an example.
Figure 11:
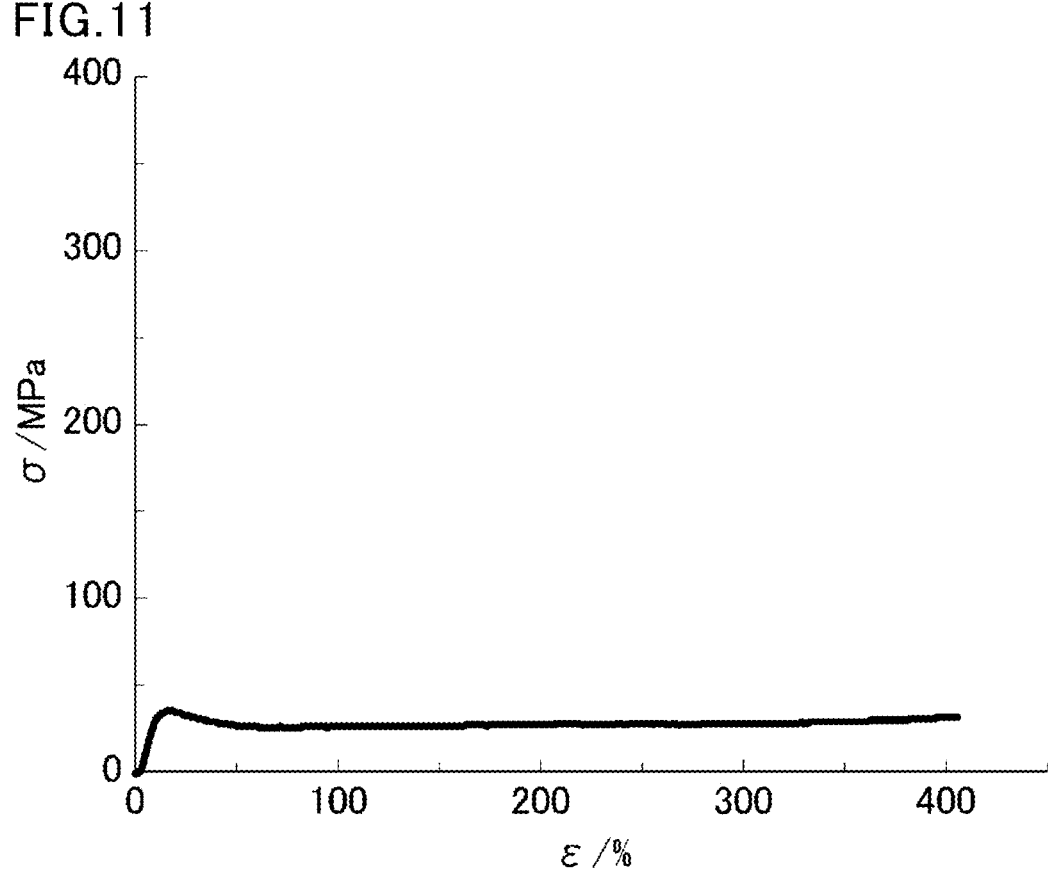
FIG. 11 is a typical diagram of the results of measuring the tensile stress at break ($\sigma_B$) and the tensile modulus ($E_t$) of a PCTFE sample in the comparative example.
Figure 12:
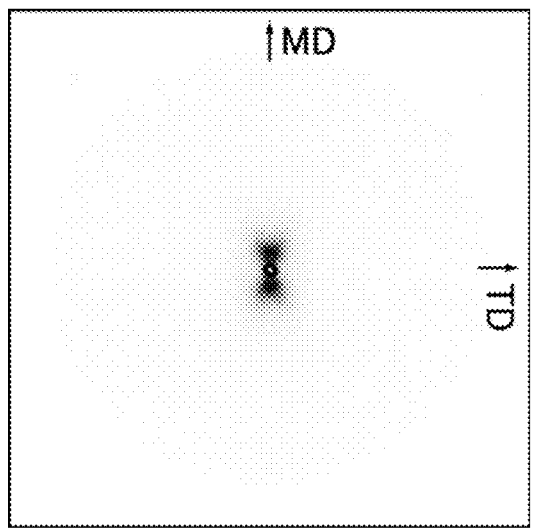
FIG. 12 is a small-angle X-ray scattering image of a sample in an example.
Figure 13:
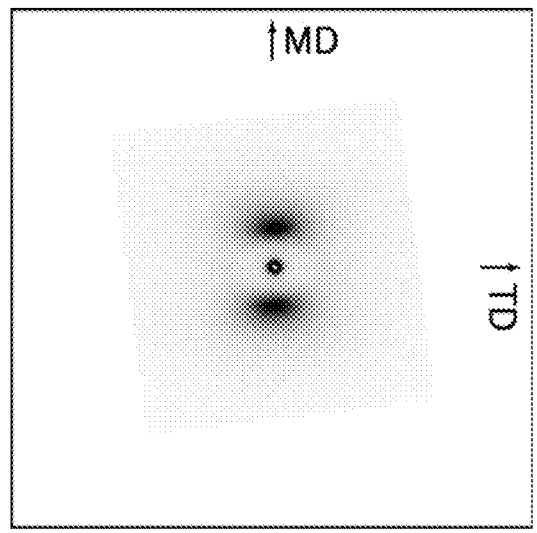
FIG. 13 is a small-angle X-ray scattering image of a sample in an example.
Figure 14:
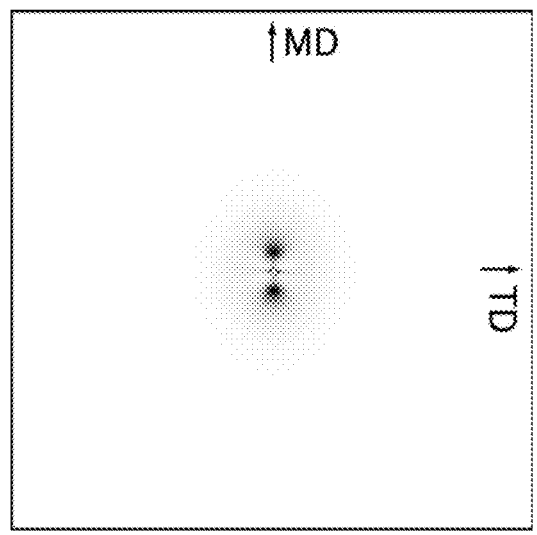
FIG. 14 is a small-angle X-ray scattering image of a sample in an example.
Figure 15:
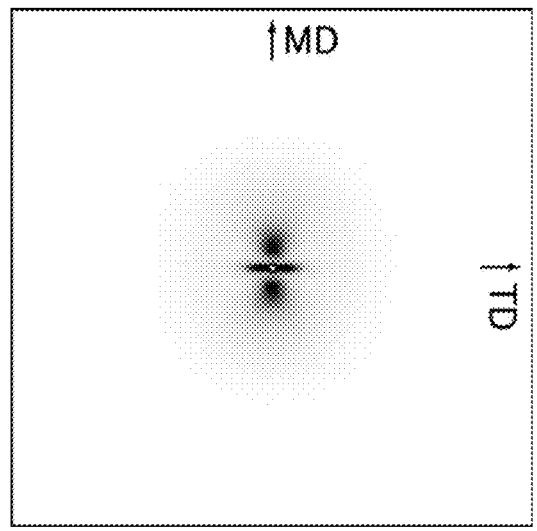
FIG. 15 is a small-angle X-ray scattering image of a sample in an example.
Figure 16:
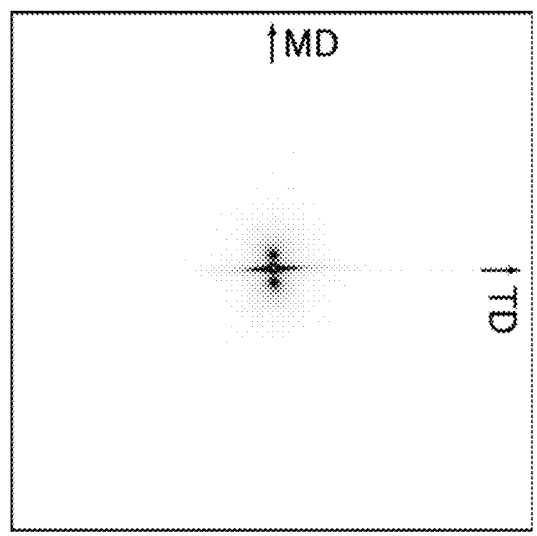
FIG. 16 is a small-angle X-ray scattering image of a sample in an example.
Figure 17:
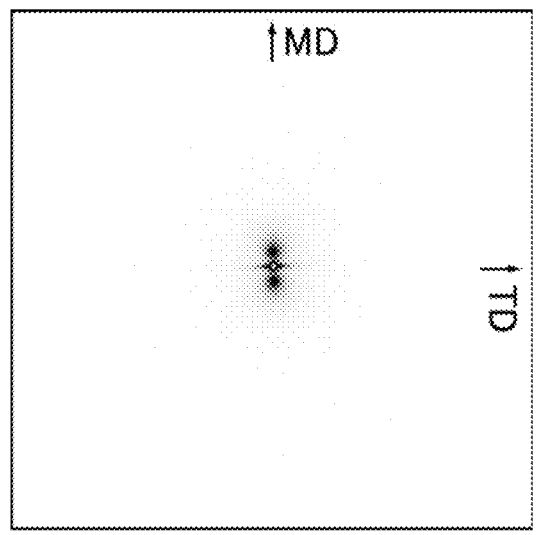
FIG. 17 is a small-angle X-ray scattering image of a sample in an example.

The tensile stress at break and the tensile modulus of the fluoropolymer samples in the examples and the PCTFE sample in the comparative example (trade name: DF-0025C1, available from Daikin Industries, Ltd.) were determined. The results are shown in Tables 2 and 4. FIG. 10 shows the results of measuring the tensile stress at break ($\sigma_B$) and the tensile modulus ($E_t$) of the sample in Example 9. FIG. 11 shows the results of measuring the tensile stress at break ($\sigma_B$) and the tensile modulus ($E_t$) of the PCTFE sample in the comparative example. Comparison between the PCTFE samples in Example 9 and Comparative Example 1 demonstrates that the sample in Example 9 had a greatly higher tensile stress at break ($\sigma_B$) and tensile modulus ($E_t$) than the sample in Comparative Example 1.

The molded articles of ETFE, VdF/TFE copolymers, and PCTFE each had a tensile stress at break of 120 MPa or higher and a tensile modulus of 1 GPa or higher, and thus had high strength.

The molded articles of PFA and FEP each had a tensile stress at break (at) of 45 MPa or higher and a tensile modulus of 0.7 GPa or higher, and thus had high strength.

INDUSTRIAL APPLICABILITY

The molded article of the invention has excellent mechanical strength and heat resistance in comparison with molded articles formed from conventional fluoropolymers, and thus can be used not only for applications of a molded article containing crystals of a conventional fluoropolymer, such as dampproof films used at high-temperature places, but also for applications of construction material sheets.

REFERENCE SIGNS LIST 1, 1': upper mold half
2: lower mold half
3: sample after rolling
3': sample before rolling
31: sample before rolling
34: sample after rolling
35: roller

The invention claimed is:

1. A molded article comprising a crystal of a fluoropolymer, the fluoropolymer comprising at least one selected from the group consisting of a polychlorotrifluoroethylene containing CTFE unit in an amount of from 90 to 100 mol % relative to the fluoropolymer, an ethylene/tetrafluoroethylene copolymer which may contain units copolymerizable with TFE and ethylene in an amount of up to 10 mol % relative to the fluoropolymer, a tetrafluoroethylene/perfluoro(alkyl vinyl ether) copolymer which may contain units copolymerizable with TFE and PAVE unit in an amount of up to 10 mol % relative to the fluoropolymer, and a tetrafluoroethylene/hexafluoropropylene copolymer which may contain units copolymerizable with the TFE unit and HFP unit in an amount of up to 10 mol % relative to the fluoropolymer, the crystal being a nano-oriented crystal having a size of 300 nm or smaller.

2. A speaker, a piezoelectric sensor, a high-speed switching device, a vibration-powered generator, a imaging device, a wearable sensor, an electrowetting device, a capacitor, a building material sheet, a roof materials of a building, a chemical liquid container, a rubber closure, or a fixing and pressure roller, comprising the molded article according to claim 1.

* * * * *